(12) United States Patent
Vidal

(10) Patent No.: US 7,258,271 B2
(45) Date of Patent: Aug. 21, 2007

(54) UPDATING OF A SMART CARD VALUE COUNTER

(75) Inventor: Jérôme Vidal, Brussels (BE)

(73) Assignee: Proton World International N.V., Zaventem (BE)

( * ) Notice: Subject to any disclaimer, the term of this patent is extended or adjusted under 35 U.S.C. 154(b) by 0 days.

(21) Appl. No.: 11/076,803

(22) Filed: Mar. 10, 2005

(65) Prior Publication Data

US 2005/0199711 A1   Sep. 15, 2005

(30) Foreign Application Priority Data

Mar. 10, 2004   (FR)   ................... 04 50485

(51) Int. Cl.
  *G06K 5/00* (2006.01)
(52) U.S. Cl. .................. 235/380; 235/492; 705/41
(58) Field of Classification Search ............. 235/380, 235/492; 705/41
  See application file for complete search history.

(56) References Cited

U.S. PATENT DOCUMENTS

| | | |
|---|---|---|
| 4,800,520 A | 1/1989 | Iijima |
| 5,649,118 A * | 7/1997 | Carlisle et al. ............... 705/41 |
| 5,806,045 A | 9/1998 | Biorge et al. |
| 6,505,773 B1 * | 1/2003 | Palmer et al. ............. 235/380 |

FOREIGN PATENT DOCUMENTS

| | | |
|---|---|---|
| EP | 1085475 A | 3/2001 |
| WO | WO 0003362 B1 | 1/2000 |

OTHER PUBLICATIONS

French Search Report from corresponding French Application No. 0450485, filed Mar. 10, 2004.

* cited by examiner

*Primary Examiner*—Michael G. Lee
*Assistant Examiner*—Kristy A. Haupt
(74) *Attorney, Agent, or Firm*—Lisa K. Jorgenson; James H. Morris; Wolf, Greenfield & Sacks, P.C.

(57) ABSTRACT

A method and a system for updating a counter of an electronic component in which are stored recordings, each containing at least one individual value and at least one sorting value, including: transferring into a memory of a reader an initial count of the counter and said recordings; calculating on the reader side an intermediary count equal to the minimum of the initial count and of the sum of the individual values of the recordings, the sorting value of which is within a range known by the reader; and transferring into the counter of the electronic component a number which is a function of the intermediary count.

32 Claims, 2 Drawing Sheets

UPDATING OF A SMART CARD VALUE COUNTER

BACKGROUND OF THE INVENTION

1. Field of the Invention

The present invention relates to the field of smart cards, and more specifically of smart cards forming an e-purse which are intended to be preloaded or reloaded with fiduciary values which are then debited from the card along uses.

2. Discussion of the Related Art

Such smart cards forming an e-purse can integrate other functions, for example, that of conventional credit cards, cash retrieval cards, etc.

The present invention more specifically applies to the management of voucher payment operations, in particular in catering-type services. In this application, the present invention especially aims at enabling use of e-purse cards of conventional architecture.

FIG. 1 schematically shows in the form of blocks a conventional example of a smart card 1 (E) forming an e-purse having a fiduciary value totalization counter 2 (COUNT) debited by a distant reader 3. In FIG. 1, the debit operation of counter 2 has been very schematically symbolized on the side of reader 3 by a block 4 (DEB). In practice, reader 3 generally checks the authenticity of card 1, checks that the fiduciary value balance present in counter 2 is sufficient for the desired debit, then decreases the count of counter 2.

On the side of card 1, in the application to electronic payment, the components essentially are an operation processing and control circuit 5 (CT), a memory 6 dedicated to storing a history (HIST) of the payment operations performed by the card, and counter 2. The history of the operations on the card side is stored in memory 6 as a stack, be it for credit operations, that is, increments to the balance of counter 2 (card reloading) or for debit operations (purchases made by means of the card). Most often, memory 6 is then divided into two areas respectively dedicated to reload and spending histories.

Cards of e-purse type are capable of being reloaded with fiduciary values (generally, monetary), then debited along purchases in shops.

However, current systems do not enable operations with vouchers, which have the characteristic of having an indivisible fiduciary value and/or of having an expiry date. For example, vouchers used for catering services have a predetermined value and are only valid for a given time.

It would be desirable to have an electronic system of smart card type to avoid handling paper vouchers as is currently the case. A problem then is that, unless a significant calculation capacity is available, smart cards do not enable calendar management.

Now, for reasons of security against fraud, it is not desirable to suppress the calendar limits of vouchers or the like.

Further, vouchers generally comprises a serial number (successive or not), often per book.

Another problem particularly present in simplified smart cards of e-purse type is that a single totalization counter is available on the card and that the organization of the available memory is pre-established as a stack. Further, recordings cannot be selectively erased, which thus does not enable suppressing vouchers beyond their expiry date.

SUMMARY OF THE INVENTION

The present invention aims at providing a novel technique for updating a smart card counter or the like to enable managing fiduciary values with an expiry date and/or of indivisible value.

The present invention also aims at providing a solution which requires no structural modification of conventional electronic payment cards and, especially, which is compatible with the use of a memory organized in the form of a stack.

The present invention also aims at providing a solution which is particularly well adapted to an electronic management of vouchers and, in particular, at enabling management of the serial numbers of such vouchers.

More generally, the present invention aims at providing a solution to update a counter in an electronic component communicating with a base or a reader (be it by contact or contactless means) on request of this base, but taking into account information contained in the actual component.

To achieve these and other objects, the present invention provides a method for updating a counter of an electronic component in which are stored recordings, each containing at least one individual value and at least one sorting value, comprising:

transferring into a memory of a reader an initial count of the counter and said recordings;

calculating, on the reader side, an intermediary count equal to the minimum of the initial count and of the sum of the individual values of the recordings, the sorting value of which is comprised within a range known by the reader; and transferring into the counter of the electronic component a number which is a function of the intermediary count.

According to an embodiment of the present invention, said number is equal to said intermediary count.

According to an embodiment of the present invention, said number is an increment or decrement value equal to the difference between the intermediary count and the initial count.

According to an embodiment of the present invention, the counter of the electronic component is decremented or incremented by a value known by the reader.

According to an embodiment of the present invention, said number is a final count equal to the intermediary count incremented or decremented by a value known by the reader.

According to an embodiment of the present invention, said number is an increment or decrement value equal to the difference between the intermediary count and the initial count, plus or minus a value known by the reader.

According to an embodiment of the present invention, the sorting value is a date.

According to an embodiment of the present invention, said sorting value is a number assigned to each value.

According to an embodiment of the present invention, a first sorting value is a date and a second sorting value is a number assigned to each value.

According to an embodiment of the present invention, said range known by the reader has, as an upper limit, the current date.

According to an embodiment of the present invention, a same recording contains at least one individual value, a number of values, and a sorting value.

According to an embodiment of the present invention, said value known by the reader is an integral multiple of the individual value of at least one recording.

According to an embodiment of the present invention, said individual values are fiduciary values.

According to an embodiment of the present invention, said recordings are loaded into the electronic component in accordance with the sorting value.

The present invention also provides a smart card or the like comprising a counter and a memory organized as a recording table of stack type, each recording in the table containing at least one individual value and at least one sorting value.

According to an embodiment of the present invention, the card forms the electronic component having its counter updated.

The present invention also provides a method of electronic management of vouchers supported by an electronic component of smart card type or the like.

The present invention also provides a method of electronic management of vouchers supported by electronic components of smart card type or the like, comprising at least one reader likely to communicate with an electronic component, to update the counter of this component.

According to an embodiment of the present invention, the system further comprises at least one server likely to communicate with several readers.

According to an embodiment of the present invention, the system comprises means for checking the authenticity of the vouchers processed by said readers.

The foregoing and other objects, features, and advantages of the present invention will be discussed in detail in the following non-limiting description of specific embodiments in connection with the accompanying drawings.

DETAILED DESCRIPTION

Figure 1:
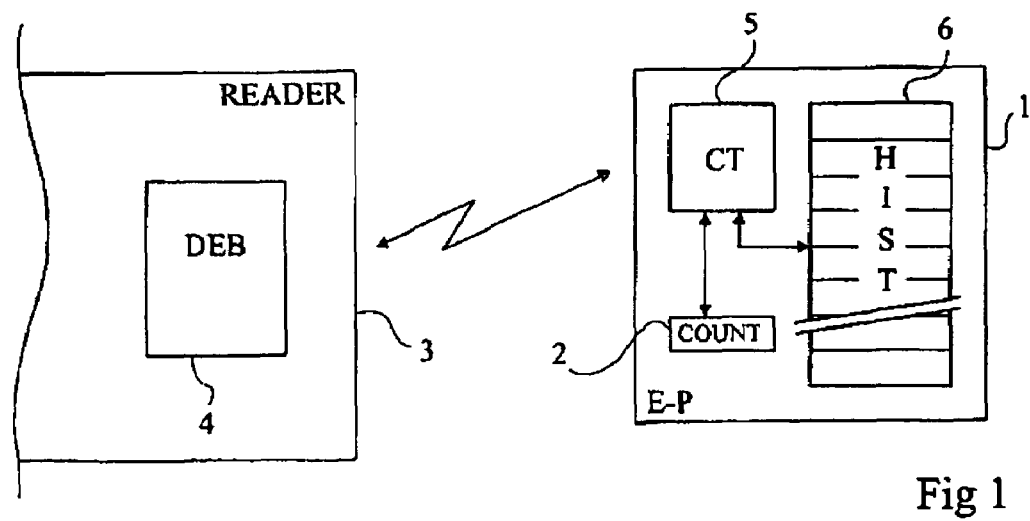
FIG. 1, previously described, very schematically shows in the form of blocks an example of a smart card system of e-payment type to which the present invention more specifically applies.

The same elements have been designated with the same reference numerals in the different drawings. For clarity, only those elements and method steps which are necessary to the understanding of the present invention have been shown in the drawings and will be described hereafter. In particular, the translation of the method according to the present invention into a language interpretable for a software implementation is not described in detail because the present invention being compatible with any conventional software adaptation. Further, the details constitutive of a smart card, of a reader, or of the server have not been discussed except for what concerns the present invention, their possible adaptation being within the abilities of those skilled in the art.

The present invention will be described hereafter in relation with an example of application to a smart card of e-purse type communicating with a reader for an application of voucher or the like management. However, the present invention more generally applies as soon as a counter is desired to be updated in a first electronic component, by means of another component with which this first component communicates with or without contact, and as similar problems are posed.

A feature of the present invention is to transfer, to the card reader, not only the count (fiduciary value) of the card counter, but also the content of its memory corresponding to the reload, that is, to the totalization counter incrementation by one or several quantities corresponding to the values (for example, indivisible) of the vouchers. Thus, the present invention provides storing, on the card side and in a memory organized as a shift recording stack, not only the fiduciary value of each voucher or the like, but also at least one sorting or header value. This sorting value may be an incremental number of voucher book serial number type or be a calendar datum, that is, the expiration date, expressed as a full date or as a month or year.

Another feature of the present invention is to have the card reader recalculate the updated fiduciary available value of the card. Thus, in the case where the card counter takes expired vouchers into account, said counter is decreased to only contain the valid vouchers.

According to the present invention, upon card reload by acquisition of new vouchers, said vouchers are loaded into the shift memory. As for fiduciary value reloads in e-purses, the only precaution is to forbid a reload if the last value in the stack (the oldest) has not expired yet.

For the implementation of the present invention, the vouchers must be used (spent) in the same order as that in which they have been acquired (loaded) in the table and, on reload, a vouchers can only be loaded into the card if it does not expire before the vouchers already present therein.

Figure 2:
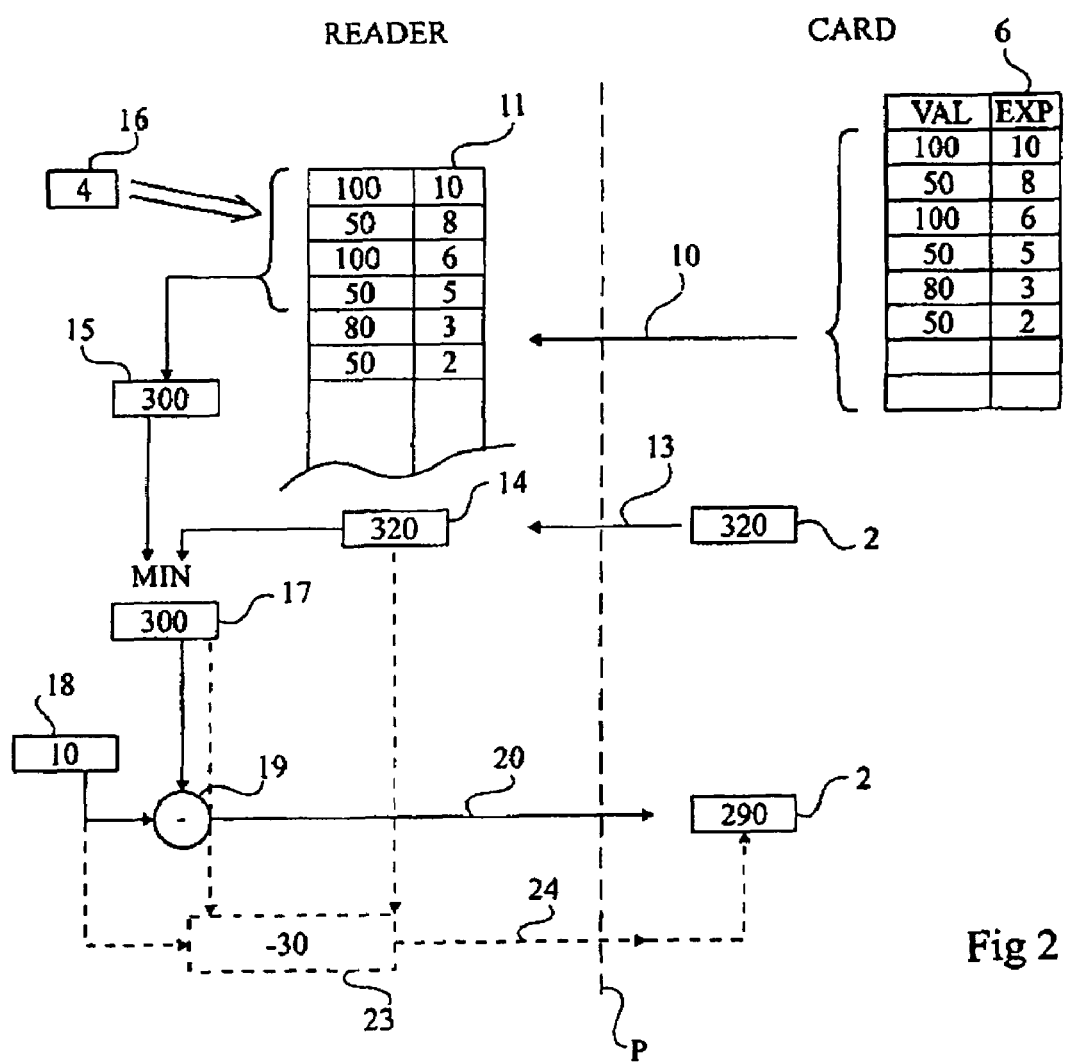
FIG. 2 illustrates an embodiment of the counter updating method according to the present invention.

FIG. 2 very schematically illustrates an implementation mode of the counter updating method according to the present invention. This drawing illustrates, to the right of a dotted line p, the operations which are performed on the card side and, to the left of the dotted line, the operations which are performed by the reader with which the card conventionally communicates, with or without a contact. Of course, before implementing the method of the present invention, conventional steps of card authentication and completion of the communication protocol are implemented.

In this example, it is assumed that vouchers are loaded into memory 6 of the card individually and that only fiduciary value VAL of the voucher and its expiration date EXP are exploited. Another embodiment in which account will be taken of the voucher serial number and in which the vouchers are input into the memory by book will be considered hereafter in relation with FIG. 4.

In the embodiment implemented in FIG. 2, each recording of table 6 contains a fiduciary value, respectively 100, 50, 100, 50, 80, and 50 and its expiry date, here indicated in the form of a month, respectively 10, 8, 6, 5, 3, and 2. In practice, the expiry date will of course take the year into account but this changes nothing to the discussion of the present invention.

Once the steps of card authentication have been carried out and the communication protocol has been initialized, the content of table 6, that is, the fiduciary values and the respective dates of expiry are transferred towards the reader (arrow 10) to be temporarily stored in a memory thereof in the form, here again, of a table 11, the respective recordings of which comprise the fiduciary value and the expiration of each of the vouchers.

The initial count (block 2) of the card counter is also transferred (arrow 13) to the reader. In this example, this initial count is assumed to have a value of 320. The value contained in counter 2 is independent from the respective values of the recordings of table 6 in that some vouchers may have already been consumed without for them to have disappeared from table 6. On the reader side, the initial value of the counter is stored in a register (symbolized by a block 14).

According to the present invention, the reader recalculates, from the recordings of its table 11, the total of the respective fiduciary values of the unexpired vouchers and stores it in a register or the like (block 15). In other words, from a current date contained in a register or the like (block 16), which is here assumed as being month 4, the reader calculates the total of all the respective values of the vouchers having posterior dates of expiry. In the example of FIG. 2, this amounts to eliminating the last two vouchers of respective values 80 and 50, the dates of expiry of which respectively are 3 and 2.

Whether these vouchers have or not been consumed by the user in previous purchases matters little. In an application to vouchers with an expiry date, they are no longer valid.

More generally, the reader calculates a total of values having a sorting value within a range known by the reader. This range here is a range of dates but it may also be a range of serial numbers, etc.

The reader then calculates an intermediary count corresponding to the smallest value (MIN) between the initial count (value 320 in block 14) and the sum of the individual values of the valid recordings that it has just calculated (value 300, block 15). In the example of FIG. 2, the initial count of 320 is greater than the sum of the still valid vouchers, which means that a value 20 is lost for the user. Fractionable vouchers, that is, with dividable fiduciary values, are here assumed. The intermediary count is stored in a register 17 or the like.

The user is assumed to have desired to spend a value 10 which is stored in a temporary register (block 18) of the reader. This value known by the reader is, for example, keyed in by a shopkeeper that the user wishes to pay with a voucher. After having checked that the balance contained in register 17 is greater than the purchase value, the reader decreases this intermediary count (block 19, −) by the purchase made before transferring (arrow 20) the final count to the card, in which it is stored as the new value (here, 290) of counter 2.

According to an alternative embodiment, the decrement operation is performed by the card. In this case (illustrated by dotted lines in FIG. 2), the reader calculates a decrement value (block 23, −30) corresponding to the difference between the intermediary count (300) and the initial count (320), further decreased by the purchase value (10). This decrement value is then transmitted (arrow 24) to the card to decrement the counter. The same result as in the first embodiment is of course obtained.

According to another alternative, the intermediary count is transferred to the card (in the form of a decrement or as such) as soon as it has been calculated. In the case of a purchase, the final balance is transferred to the card in a second phase in the form of a decrement or as such. In the absence of any purchase, it may be a mere updating of the card counter after expiration of some vouchers.

In fact, whatever the embodiment or the alternative, a number which is a function (which takes account) of the intermediary count is transferred from the reader to the card to update the card counter.

The updating method which has been described hereabove in relation with an application to a purchase is also valid, with slight modifications, to update the fiduciary value of the card counter in case of an incrementation by loading of new vouchers. In this case, the purchase value (block 18) is replaced with an increment value. A simple way is to provide an adder instead of the subtractor 19 and to load register 18 with a negative value in case of a purchase and with a positive value in case of a reload. The alternatives described in relation with the purchase are compatible for a reload (transfer of the final balance, transfer of the increment, transfer of the intermediary count by increment/ decrement or as such, etc.). An additional step in the case of a reload comprises transferring the new voucher(s) (value, expiry date, etc.) into table 6 of the card.

An advantage of the present invention, which already appears from the description of the simplified embodiment of FIG. 2, is that it enables taking into account the expiry dates of fiduciary values without for the card to have to process this calendar function.

Another advantage of the present invention is that its implementation is then compatible with simplified cards of e-purse type. It is enough to use their stack type memory to store the recordings corresponding to the vouchers and to their respective dates of expiry.

It should be noted here that what has been described hereabove in relation with calendar deadlines may apply to other sorting data, for example, the voucher serial number.

Figure 3:
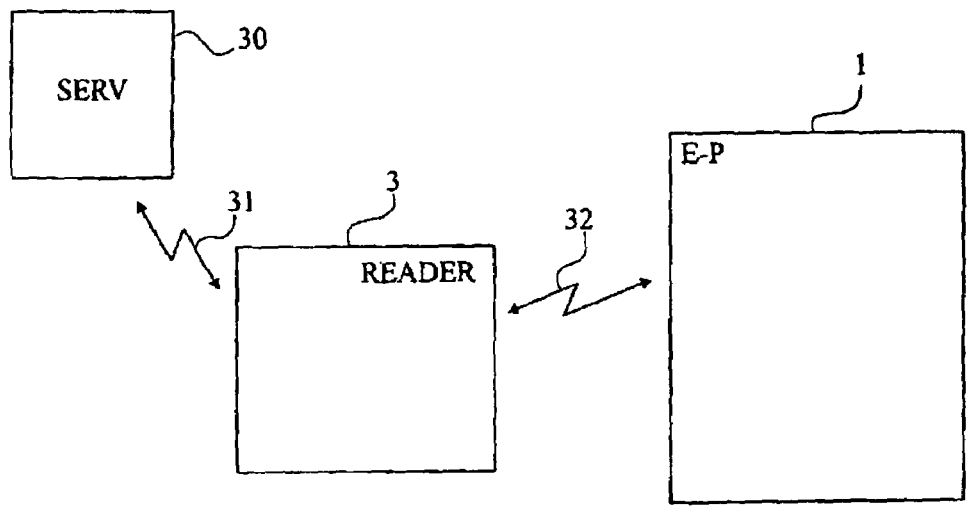
FIG. 3 very schematically shows, in the form of blocks, the elements of an electronic voucher management system according to a preferred embodiment of the present invention.

FIG. 3 very schematically shows, in the form of blocks, elements of a voucher management system according to the present invention in which the serial numbers of the vouchers are also desired to be taken into account.

Such a system essentially comprises a server 30 (SERV) communicating with one of several readers (or reader recorder) 3 of a smart card 1 of e-purse type. The constitutive details of the server, of the card, and of the reader have not been illustrated, the hardware components being conventional. The reader and the server communicate with or without contact (arrow 31). For example, the server is accessible over a connection of Internet type to several readers distributed in shops. As for the reader-to-card communication, it is also with or without contact (arrow 32). Further, the reader may be separate from a recorder (to reload the card) or be combined therewith, according to applications.

Figure 4:
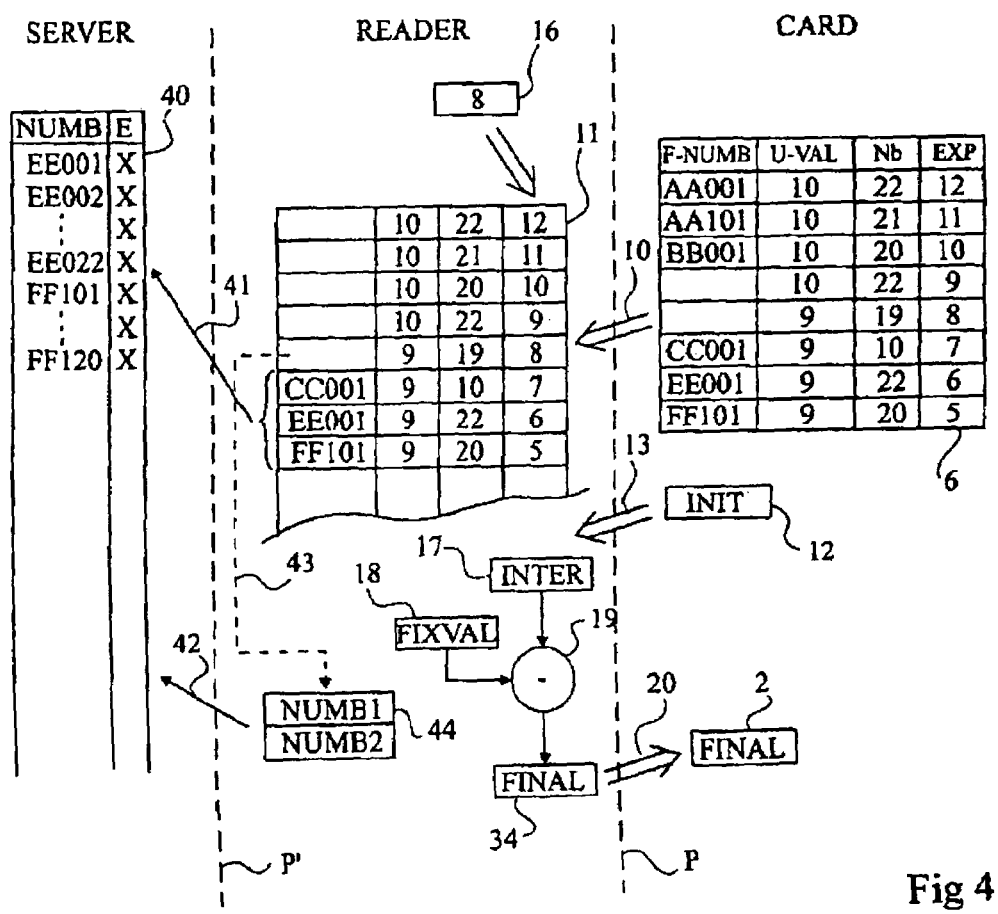
FIG. 4 illustrates an embodiment of the present invention applied to the system of FIG. 3.

FIG. 4 illustrates, in a view to be compared with FIG. 2, a preferred embodiment of the present invention for the electronic management of vouchers identifiable by a serial number (NUMB) and having an expiry date (EXP) and an indivisible fiduciary value (U-VAL). Indivisible means that a purchase made by a user by means of such a voucher, even if it is of a value smaller than the fiduciary value of the voucher, compels him to spend all of it.

As for FIG. 2, dotted lines, here p and p′, have been used to separate the elements of the card (right-hand portion) from those of the server (left-hand portion) and from the reader side (between dotted lines p and p′).

On the card side, each recording of table 6 comprises four data: the first number (F-NUMB) of the voucher book, the unity value (U-VAL) of each voucher in the book or in the series, number Nb of vouchers in the book or in the series, and expiry date EXP of these vouchers. In this example, it has been assumed that all vouchers have until the month of August (8) a unity value 9, and that all subsequent vouchers have a unity value of 10. The serial numbers (AA001, AA101, BB001, CC001, EE001, FF101) have been indicated arbitrarily as well as the number of vouchers per book and their unity values and dates of expiry.

As in the first embodiment, the recordings of table 6 are transferred (arrow 10) to the reader where they are stored in a memory (table 11). Table 11 has the same structure as table 6 of the reader. Similarly, initial count (block 12) INIT of the card is transferred (arrow 13) to the reader.

As in the first embodiment still, the reader calculates an intermediary count (block 17) INTER as corresponding to the smallest value between the initial count transferred from the card and the sum of the individual values of the recordings, the date of which has not expired. It is here assumed that the current month (block 16) is August (8). Accordingly, the intermediary count corresponds to the sum of the respective values of the voucher books having a expiry date subsequent or equal to 8. In practice, the reader multiplies the unity values by the number of vouchers per book and adds up all of these products. In the example shown in FIG. 4, this sum of the individual values of the recordings corresponds to 1,021.

If the operation is a debit, the reader decrements the intermediary value by a fixed value (FIXVAL, block 18) corresponding to the value of the purchase, corresponding to an integral multiple of the oldest available unity values (here, 9). The final count (block 34, FINAL) is then transferred (arrow 20) to the card to update the content of counter 2.

In the embodiment of FIG. 4, the serial numbers of the vouchers are further managed by the server. In other words, the server contains a table 40 of the serial numbers (NUMB) of the different emitted vouchers and, in relation with these serial numbers, a pointing datum (E). The reader then transmits to the server the serial numbers of the expired vouchers that it does not take into account in the intermediary count calculation. In this example, numbers CC001, EE001, FF101, as well as corresponding numbers 10, 22, and 20 of these vouchers. In the case where the server has not yet received the information of a consumption of these vouchers, it assigns a pointing datum thereto. As an alternative, the server only takes the unexpired vouchers into account and itself eliminates all the serial numbers of the expired vouchers.

A verification of the serial numbers is also used to authenticate vouchers contained in the card to detect certain frauds. Such an adaptation of the present invention is within the abilities of those skilled in the art.

According to another alternative, also valid in the first embodiment (FIG. 2), the difference between the intermediary count and the initial count (and thus the value of the expired vouchers) is transmitted by the reader to the server, with or without the serial numbers.

Preferably, on realization of the purchase by the debit of the intermediary count by the value contained in register 18, the reader assigns to this purchase one or several vouchers of table 11 and stores them to communicate the corresponding numbers (arrow 42) to the server so that it considers them as pointed (used). This operation is symbolized in the FIG. 4 by an arrow in dotted lines 43 from table 11 to temporary registers 44 (NUMB1, NUMB2, etc) and by an arrow 42 of transfer to the server. The transaction between the reader and the card is generally not simultaneous with the connection between the reader and the server. The information (used vouchers) is stored in the reader and transmitted to the server, for example, on request or periodically (for example, every evening).

An advantage of the present invention is that it enables electronic management of vouchers (for example, of meal tickets), taking into account not only their expiry date but also the serial numbers of the different vouchers.

Another advantage of the present invention is that it is compatible with an exploitation of these vouchers, be it by book (FIG. 4) or individually. This adaptation depends in particular on the size of the memory table available in the card. In simplified smart cards, this memory is relatively limited and the exploitation of the vouchers by books then has the advantage of enabling greater storage.

It should be noted that the present invention applies whether the smart card is a single-application card, that is, an e-purse only, or also comprises other functions (payment card, debit card, etc.).

Of course, the present invention is likely to have various alterations, modifications, and improvements which will readily occur to those skilled in the art. In particular, the combination with systems of voucher authentication and verification is within the abilities of those skilled in the art by using conventional methods.

Further, although the present invention has been more specifically described in relation with an application to vouchers, it more generally applies to the updating of a counter in an electronic component of smart card type or the like and in which it is desired to take a sorting value into account, while this electronic component comprises no calculation means to take it into account.

Moreover, the management of the fiduciary values read from the card according to their destination (for example, the management of purchase values by transfer to an account of the shopkeeper and the management of the expired values once transferred to the voucher manager, generally the server) is within the abilities of those skilled in the art by using conventional management systems.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for updating a counter of an electronic component in which are stored recordings, each recording containing at least one individual value and at least one sorting value, the method comprising:
   transferring into a memory of a reader an initial count of the counter and said recordings;
   calculating, via the reader, an intermediary count equal to the minimum of the initial count and of the sum of the individual values of the recordings, the sorting value of which is comprised within a range known by the reader; and
   transferring into the counter of the electronic component a number which is a function of the intermediary count.

2. The method of claim 1, wherein said number is an increment or decrement value equal to the difference between the intermediary count and the initial count.

3. The method of claim 1, wherein said number is a final count equal to the intermediary count incremented or decremented by a value known by the reader.

4. The method of claim 1, wherein said number is an increment or decrement value equal to the difference between the intermediary count and the initial count, plus or minus a value known by the reader.

5. The method of claim 1, wherein the sorting value is a date.

6. The method of claim 1, wherein said range known by the reader has, as an upper limit, the current date.

7. The method of claim 1, wherein said individual values are fiduciary values.

8. The method of claim 1, wherein said recordings are loaded into the electronic component in accordance with the sorting value.

9. A smart card comprising a counter and a memory organized as a recording table of stack type, wherein each recording in the table contains at least one individual value and at least one sorting value, for implementing the method of claim 1.

10. A method of electronic management of vouchers supported by the smart card of claim 9.

11. A system of electronic management of vouchers supported by electronic components of smart card type, comprising at least one reader capable of communicating with an electronic component, to implement the method of claim 1.

12. The system of claim 11, further comprising a server capable of communicating with several readers.

13. The system of claim 12, comprising means for checking the authenticity of the vouchers processed by said readers.

14. A method for updating a counter of an electronic component in which are stored recordings, each recording containing at least one individual value and at least one sorting value, the method comprising:
   transferring into a memory of a reader an initial count of the counter and said recordings;
   calculating, via the reader, an intermediary count equal to the minimum of the initial count and of the sum of the individual values of the recordings, the sorting value of which is comprised within a range known by the reader;
   transferring into the counter of the electronic component a number which is a function of the intermediary count; and
   wherein said number is equal to said intermediary count.

15. The method of claim 14, comprising decrementing or incrementing the counter of the electronic component by a value known by the reader.

16. The method of claim 15, wherein said value known by the reader is an integral multiple of the individual value of at least one recording.

17. A method for updating a counter of an electronic component in which are stored recordings, each recording containing at least one individual value and at least one sorting value, the method comprising:
   transferring into a memory of a reader an initial count of the counter and said recordings;
   calculating, via the reader, an intermediary count equal to the minimum of the initial count and of the sum of the individual values of the recordings, the sorting value of which is comprised within a range known by the reader;
   transferring into the counter of the electronic component a number which is a function of the intermediary count; and
   wherein said sorting value is a number assigned to each value.

18. A method for updating a counter of an electronic component in which are stored recordings, each recording containing at least one individual value and at least one sorting value, the method comprising:
   transferring into a memory of a reader an initial count of the counter and said recordings;
   calculating, via the reader, an intermediary count equal to the minimum of the initial count and of the sum of the individual values of the recordings, the sorting value of which is comprised within a range known by the reader;
   transferring into the counter of the electronic component a number which is a function of the intermediary count; and
   wherein a first sorting value is a date and a second sorting value is a number assigned to each value.

19. A method for updating a counter of an electronic component in which are stored recordings, each recording containing at least one individual value and at least one sorting value, the method comprising:
   transferring into a memory of a reader an initial count of the counter and said recordings;
   calculating, via the reader, an intermediary count equal to the minimum of the initial count and of the sum of the individual values of the recordings, the sorting value of which is comprised within a range known by the reader;
   transferring into the counter of the electronic component a number which is a function of the intermediary count; and
   wherein a same recording contains at least one individual value, a number of values, and a sorting value.

20. An apparatus comprising:
   a communication circuit to transmit and to receive data from an electronically-readable card;
   a first memory to store data received from an electronically-readable card, wherein the data comprises a table comprising a plurality of first values, each first value associated with a sorting value of a plurality of sorting values, and a net value that is a function of the first values stored in the table;
   a second memory to store a total value of a transaction; and
   a controller, configured to calculate a sum of a subset of first values in the table and an intermediary value that is a minimum of the sum and the net value, the controller further configured to adjust the intermediary value based on the total value of the transaction to calculate a new net value.

21. The apparatus of claim 20, wherein the apparatus is a smart card reader and the electronically-readable card is a smart card.

22. The apparatus of claim 20, wherein the first values are monetary values.

23. The apparatus of claim 20, wherein the sorting values are expiration dates for the first values.

24. The apparatus of claim 23, wherein the subset comprises first values that have not yet expired, being determined by comparing the expiration dates associated with the first values to a current date stored in a third memory.

25. The apparatus of claim 20, wherein the transaction is a purchase of at least one item, and the total value is a function of the cost of the at least one item.

26. The apparatus of claim 20, wherein the communication circuit transmits the new net value to the electronic device.

27. A method comprising:
   transmitting from an electronically-readable card to a terminal a table comprising a plurality of first values, each first value associated with a sorting value of a plurality of sorting values;
   calculating, at the terminal, a sum of a subset of first values in the table;

calculating, at the terminal, an intermediary value that is a minimum of the sum and the net value;

adjusting the intermediary value, at the terminal, based on a total value of a transaction to calculate a new net value; and transmitting from the terminal to the electronically-readable card the new net value.

28. The method of claim 27, wherein the terminal is a smart card reader and the electronically-readable card is a smart card.

29. The method of claim 27, wherein the first values are monetary values.

30. The method of claim 27, wherein the sorting values are expiration dates for the first values.

31. The method of claim 30, wherein the subset comprises first values that have not yet expired, being determined by comparing the expiration dates associated with the first values to a current date stored in a memory by the terminal.

32. The method of claim 27, wherein the transaction is a purchase of at least one item, and the total value is a function of the cost of the at least one item.

* * * * *